United States Patent [19]

Stapleford et al.

[11] 3,768,082

[45] Oct. 23, 1973

[54] MAGNETIC DRUM STORAGE APPARATUS

[75] Inventors: Gary N. Stapleford; Robert E. Tellier, Nashua, both of N.H.

[73] Assignee: Sanders Associates, Inc., Nashua, N.H.

[22] Filed: Nov. 28, 1969

[21] Appl. No.: 880,583

[52] U.S. Cl. .......................... 340/174.1 C, 346/137

[51] Int. Cl. .......................... G11b 5/00

[58] Field of Search .......................... 340/174.1 C; 346/137

[56] References Cited

UNITED STATES PATENTS

| | | | |
|---|---|---|---|
| 3,521,033 | 7/1970 | May | 235/61.11 C |
| 2,680,239 | 6/1954 | Daniels | 235/92 DP |
| 3,339,175 | 8/1967 | Forester | 340/174.1 C |
| 3,324,281 | 6/1967 | Morse | 340/174.1 C |
| 3,286,033 | 11/1966 | Lemelson | 340/174.1 C |

OTHER PUBLICATIONS

Bulletin 310–67, Hunter Spring Division of Ametek, Inc., Hatfield, Pa., 1966, page 6.

*Primary Examiner*—Maynard R. Wilbur
*Assistant Examiner*—Robert F. Gnuse
*Attorney*—Louis Etlinger

[57] ABSTRACT

A random access magnetic drum memory for storage of digital and analog information, having a plurality of parallel, axially extending data tracks, is incrementally rotated to a predetermined position in response to a command signal. Once the data track indicated by an input address has been located, a transducer is scanned axially on the drum to read out the data stored in such track or to record data on such track. The transducer is scanned by means of a carriage drive motor either in a step-mode or in a linear mode. Once the addressed data track or portion thereof has been scanned, a spring return mechanism causes the transducer to return to its initial position. Apparatus is also disclosed for determining the position of the transducer on the track so that, if desired, only a portion of the track need be scanned. Also disclosed is a dual track arrangement so that both audio and digital information may be played back or recorded at the same time.

19 Claims, 23 Drawing Figures

INVENTORS
GARY N. STAPLEFORD
ROBERT E. TELLIER

BY
John S. Solakian
ATTORNEY

INVENTORS
GARY N. STAPLEFORD
ROBERT E. TELLIER
BY John S. Solakian
ATTORNEY

INVENTORS
GARY N. STAPLEFORD
ROBERT E. TELLIER

BY John S. Solakian
ATTORNEY

INVENTORS
GARY N. STAPLEFORD
ROBERT E. TELLIER
BY John S. Solakian
ATTORNEY

INVENTORS
GARY N. STAPLEFORD
ROBERT E. TELLIER

BY John S. [signature]
ATTORNEY

INVENTORS
GARY N. STAPLEFORD
ROBERT E. TELLIER
BY
John S. Solakian
ATTORNEY

MAGNETIC DRUM STORAGE APPARATUS

BACKGROUND OF THE INVENTION

1. Field of the Invention

This invention relates to apparatus for storing digital and audio information and more particularly to a moving transducer magnetic drum memory which provides random access to axially disposed information storage tracks.

2. Description of the Prior Art

In the prior art, various types of magnetic memories have been used in association with computers and display devices. Such memories included magnetic core memories, recirculating delay line memories, and the like. They also included such storage media as magnetic disc files, magnetic tape files as well as magnetic drums. Various other storage media have also been used. The apparatus of the present invention utilizes that type of storage media employing magnetic recording material. More particularly, the apparatus of the present invention is a magnetic memory drum.

A magnetic memory drum, is a cylinder or drum whose exterior surface is coated with a magnetic material. After the drum is rotated about its axis to a particular data track, a transducer head placed contiguous to the drum surface is scanned along the surface, and information is then recorded or played back in or from such surface of the drum.

One of the prior art storage devices is a disc storage device in which data is sorted in small magnetized spots arranged in circular tracks around magnetic discs which are rotated at high speeds. This type of storage is usually used where high speed data recording and retrieval is required. Although the access time to information stored therein is quite fast, the associated electronics and electro-mechanical design becomes complex and expensive. Consequently, such device is not suitable for the medium speed access requirement of, for example, educational systems, some reservation systems, some bulk storage media, and the like because of the expense, etc. The prior art also included magnetic tape or belt storage systems. Such systems might be of the high speed access type wherein a full rack cabinet might be used for housing a single tape storage, or they might be simply a tape cassette or tape deck storage device. The high-speed tape system, as was the case for the disc file, was quite necessary for use with high-speed computer systems. However, the expense prohibited use of such tape and disc systems for low cost applications. On the other hand, the use of the conventional low cost tape cassette or tape decks require a substantially long access time, and, although fairly inexpensive, were not suitable in systems which required information to be located in one or two seconds; that is, if one desired information on extreme ends of the tape deck. Several seconds would pass before a low-cost tape deck could locate such information.

It is, therefore, desirable to bridge the gap between the low-cost tape deck and the high-speed disc storage and tape deck devices, and accordingly the magnetic drum of the present invention may be used. In the prior art, such magnetic drums have been used, but have been limited. Such limitations included the lack of a random access capability.

In one such prior art device, the transducer passed around the drum in a spiral motion so that a long recording track might result, i.e., each spiral track is comprised of a multitude of revolutions instead of merely one. However, access to a portion of this data track was quite slow, and therefore not desirable. Another such apparatus employed tabular discs axially located along the transducer path. The shaft supporting these discs would be rotated so that the tab in alignment with the track on the drum desired would stop the travel of the transducer in the axial direction and cause the transducer to read the circumferential track at that location.

Such prior art devices were also limited in that playback or recording by the transducer on the individual data tracks was not addressable; i.e., once a track was selected for playback or recording, the entire track must have been scanned by the transducer before another track could be selected. Another limitation of the prior art devices included the fact that the transducer be scanned through the track in a linear motion rather than in an incremental motion. This fact is very important when digital information is to be stored, i.e., the transducer motion could be stopped while a block or bit of digital information is stored, the transducer could then be stepped to the next data track storage position, thereby providing a capability of more compact data storage. Also lacking in these prior art devices employing axially moving transducers, was the use of constant torque spring return mechanisms whereby the transducer could be returned to its initial position with a constant velocity and the moving means of the transducer would not be required to exert an excessive torque as the transducer approached it.

Other problems associated with the prior art either singly or in combination with the limitations noted hereinabove are the desirability of a removable magnetic drum, the capability of playback of digital and audio information simultaneously as well as the capability of a long data track utilizing two transducers in an alternate mode. It is especially important that the limitations of the prior art have been relieved by the apparatus of the present invention while still utilizing a rather simple construction which is relatively inexpensive.

SUMMARY AND OBJECTS OF THE INVENTION

Accordingly, it is an object of the invention to provide an improved magnetic drum storage apparatus.

Another object of the invention is to provide a magnetic storage drum which may be randomly accessed.

Still another object of the invention is to provide a random access magnetic drum which can record and play back digital and/or analog information.

Yet, another object of the invention, is to provide a random access magnetic storage media which has data tracks disposed axially thereon, and which utilizes a transducer in contiguous relationship to the magnetic surface of such storage media, said transducer moving axially along said track in order to play back or record digital and/or analog information.

A further object of the invention is to provide a random access storage media capable of playback or recording of digital and analog information simultaneously.

Still a further object of the invention is to provide a random access magnetic storage media which is simple in construction and inexpensive to make.

The invention accordingly comprises the features of construction, combination of elements, and arrangement of parts which will be exemplified in the construction hereinafter set forth and the scope of the invention will be indicated in the claims.

Briefly, the primary embodiment of the invention utilizes a magnetic drum memory which is a cylinder whose exterior surface is covered with a magnetic material. The drum is removably and rotatably mounted on a support member, and is rotated by means of a stepping drive motor. The magnetic material placed over the surface of the drum has a plurality of axially aligned data storage tracks thereon. Random access to either one of these tracks may be had by stepping the stepping drive motor in response to a track address indicated by an operator by means of a keyboard, for example.

These data storage tracks, axially disposed on the drum, have data recorded thereon or played back therefrom by means of a transducer contiguous thereto. The transducer includes an erase head and a playback/record head mounted on a carriage which is free to move axially along the data storage tracks and which is supported by a member such as a lead screw or slide rods. Movement of the carriage and transducer supported thereon is provided by a motor and clutch assembly, or alternatively, a drive motor which may be of the linear stepping type. When the carriage has traveled the full extent of the data track or addressed portion thereof, this position is sensed and the carriage is released returning to the initial position by means of a spring return mechanism which is preferably of the constant torque type.

The position of the carriage in relationship with the drum data track is determined by actuating reed switches disposed axially along the travel of the carriage or by means of a variable resistor whose tap voltage is ganged with the movement of the carriage drive motor.

Alternative embodiments include the use of two drums around which an endless belt of magnetic material is revolved, thereby allowing a greater number of tracks. Another embodiment includes the use of two drums to each of which is secured the end of a magnetic belt. Another embodiment includes the use of a magnetic tape board which is free to move in the vertical direction, that is, a flat piece of magnetic material placed thereon allows more compact storage of the magnetic material.

In combination with these embodiments are further embodiments including a double carriage arrangement so that audio and digital information may be placed back or recorded simultaneously. In the alternative, the two carriage arrangement might be used to increase the effective length of the data tracks, i.e., while one transducer is in the playback or record mode the other transducer will be returning to its initial position so that it will be ready for the playback or record mode as soon as the other transducer has completed its present operation.

BRIEF DESCRIPTION OF THE DRAWINGS

The foregoing and other objects, features and advantages of the invention will be apparent from the following more particular description of the preferred embodiment of the invention as illustrated in the accompanying drawings in which.

DESCRIPTION OF THE PREFERRED EMBODIMENTS

Figure 1:
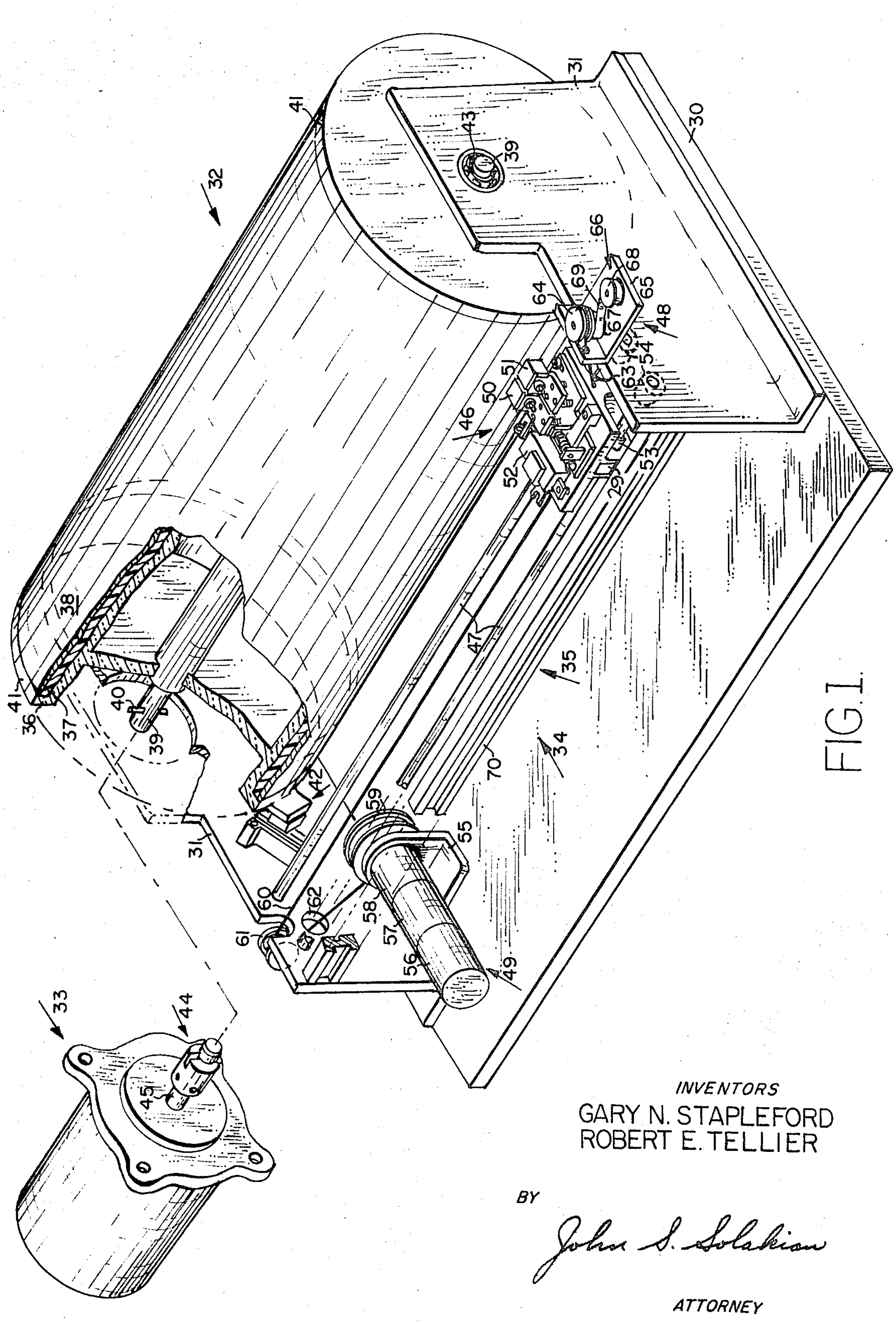
FIG. 1 is a perspective view of the main embodiment of the magnetic drum storage apparatus of the invention.

Now referring to FIG. 1 there is illustrated a first embodiment of the random access memory drum of the invention which may be used to store analog and/or digital information. Mounted to a base 30 are side support members 31. Support members 31 have mounted thereto a drum assembly 32, a drum drive motor 33, a carriage assembly 34 and a carriage position indicator assembly 35.

Magnetic drum assembly 32 comprises a cylinder 36 over which is placed a spongy material 37 which acts as a pressure pad for magnetic material 38. Cylinder 36 may be hollow and may be constructed of plastic, metal or any substantially rigid material. Cylinder 36 also includes a mounting rod 39 which may or may not extend axially through the cylinder 36. Mounting rod 39 also includes a dowel pin 40 at the drive end for removably securing the mounting rod 39 to the drive motor 33. The spongy material 37 may be made from foam rubber, styrofoam or any elastomer material and is adhered to the cylinder 36 between collars 41.

The magnetic material 38 takes the shape of an endless belt and may either be permanently secured over the drum 36 and pressure pad 37 or may be removably positioned on the drum 36. That is, the storage of the information contained in the magnetic drum assembly may be provided by storage of magnetic material 38 individually or by storage of the entire magnetic drum assembly 32.

Magnetic drum assembly 32 also has secured thereto a zero position indicating means 42 which in this embodiment includes a magnet assembly attached to the drum assembly 32 which actuates a reed switch suitably mounted to support member 31. This embodiment as well as other embodiments for indicating the zero position of the assembly 32 will be discussed hereinafter.

Magnetic drum assembly 32 is supported on support members 31 and is free to rotate thereon on a ball bearing assembly 43 at one end of the assembly 32. Drum assembly 32 is supported at the other end and may be rotated by a drive motor 33 which may be of the linear or stepping type. The magnetic drum assembly 32 is removably secured to drive motor 33 by means of the dowel pin 40 and the coupling assembly 44 mounted on the shaft 45 of drive motor 33. This removable coupling will be further discussed hereinafter.

Carriage assembly 34 includes a carriage 46, carriage slide rods 47, a carriage spring return assembly 48 and a carriage drive assembly 49. Carriage 46 includes an erase head 50, a record/playback head 51, a solenoid 52 for moving heads 50 and 51 in and out of contact with magnetic material 38, a carriage indicating magnet assembly 29, and linear ball bearings 53 for substantially free movement along carriage slide rods 47.

Carriage slide rods 47 are secured to support members 31 and are aligned parallel to the magnetic drum assembly 32. The rods 47 are positioned so that the carriage assembly 34 slides thereon with the erase head 50 of the record/playback head 51, when activated, in contiguous relationship with the magnetic material 38. Mounted over the carriage slide rod 47 at the initial position of carriage 46 as shown, are rubber cushions 54 which alleviate the jarring of carriage 46 when it is returned to its initial position by carriage spring return assembly 48. Carriage drive assembly 49 is secured to base 30 by means of a bracket 55. Carriage drive assembly 49 includes a motor 56, a gear drive 57 and a magnetic clutch 58. Attached to the shaft of carriage drive assembly 49 is a pulley 59 which couples the assembly 49 to carriage 46 by means of a cord 60 running through hole 62, around idler 61 and secured to the forward edge of carriage 46. The idler arrangement 61 mounted to support member 31 is required in order to keep the cord 60, which may be made of nylon, parallel to the rods 47 so that the carriage 46 may move between the extreme ends of the drum assembly 32. The carriage drive assembly 49 moves the carriage 46 in the direction of idler 61 when motor 56 is energized and the clutch 58 is not actuated. When the carriage 46 has completed its travel along rods 47, the clutch 58 is actuated and the motor 56 is deenergized thus allowing the carriage assembly 34 to return to its initial position by means of the carriage spring return assembly 48.

Carriage spring return assembly 48 includes a cord 63 attached at one end to the back edge of carriage 46 and attached at the other end to a pulley 64. Pulley 64 is rotatably mounted on bracket 65 which bracket 65 also mounts a constant torque spring assembly 66. This type of constant torque spring is known under the trademark "NEGATOR." The principle involved in this type of spring is as follows. The "NEGATOR" spring provides a constant tension device whereby, when the coiled spring has its outer end wound in a direction which is opposite to its natural coiling bias, there exists in that portion of the string which is extended, or flat, constant tension; and there exists at the ends of said extended portion equal and opposite forces that place the extended spring portion in a state of dynamic equilibrium. Thus, there is no linear movement of the spring. The end of the extended spring portion and more particularly the forces which exist thereon are effectively coupled to the carriage 46 so that there exists a constant torque on carriage drive assembly 49 as the carriage 46 is driven toward idler 61 and so that the carriage 46 returns to its initial position with a constant velocity when the carriage drive assembly is deenergized.

The two pulleys 67 and 68 mount the spring 69. Pulley 67 is rotatably mounted with pulley 64. When the carriage 46 is at its initial position as shown in FIG. 1, the cord 63 is fully wound up on pulley 64 whereas the spring 69 is wound up on pulley 68. When the carriage 46 is at the extreme left hand position next to idler 61, the cord 63 is now unwound from pulley 64 and the spring 69 is now coiled up on pulley 67 in a direction which is opposite its natural coiling bias. When the clutch 58 is activated and the motor 56 is deenergized, spring 69 causes the carriage 46 to be turned to initial position with a constant velocity. Rubber cushions 54 absorb a substantial amount of shock that carriage 46 might otherwise absorb.

Carriage position indicator assembly 35 is supported by support members 31 and includes a bar 70 with magnetically actuable reed switches selectively mounted thereon. When the carriage magnet assembly 29 is adjacent to one of said switches, that switch will be actuated sending out a signal indicating the position of the carriage 46 with respect to the drum assembly 32. A more detailed discussion of the carriage position indicator assembly 35 as well as the carriage 46, the drum zero position indicator assembly 42 and the removable coupling 44 etc. will be discussed hereinafter.

In addition, a bulk eraser (not shown) might be used in combination with the magnetic drum storage apparatus of the invention. The eraser would be a magnetic bar which would be as long as and positioned over the magnetic material 38 so that one revolution of the drum assembly 32 would cause the material 38 to be erased of any information when said bar is positioned contiguous to the material 38. Otherwise, by suitable mechanical means, the bar would be positioned away from the material 38.

Generally, the magnetic drum storage apparatus of the invention operates as follows. Firstly, the drum assembly 32 is positioned to the correct track by means of the drum drive motor 33. The solenoid 52 of carriage assembly 34 is then energized in order to bring the heads 50 and 51 in contact with the magnetic material 38 on drum assembly 32. The carriage drive assembly 49 is then activated so as to move carriage 46 towards idler 61. When carriage 46 has traveled along rods 47 the length desired as indicated by track position indicator assembly 35, the solenoid 52 is deenergized thereby causing the heads 50 and 51 to be pulled back from the magnetic material 38. Almost simultaneously, the carriage drive assembly 49 is deactivated thereby causing the carriage 46 to return to its initial position by means of spring return assembly 48. The system is then reset to accept further address instructions.

Figures 2, 3, 4, 5, 6, 7, 8, 9, 10:
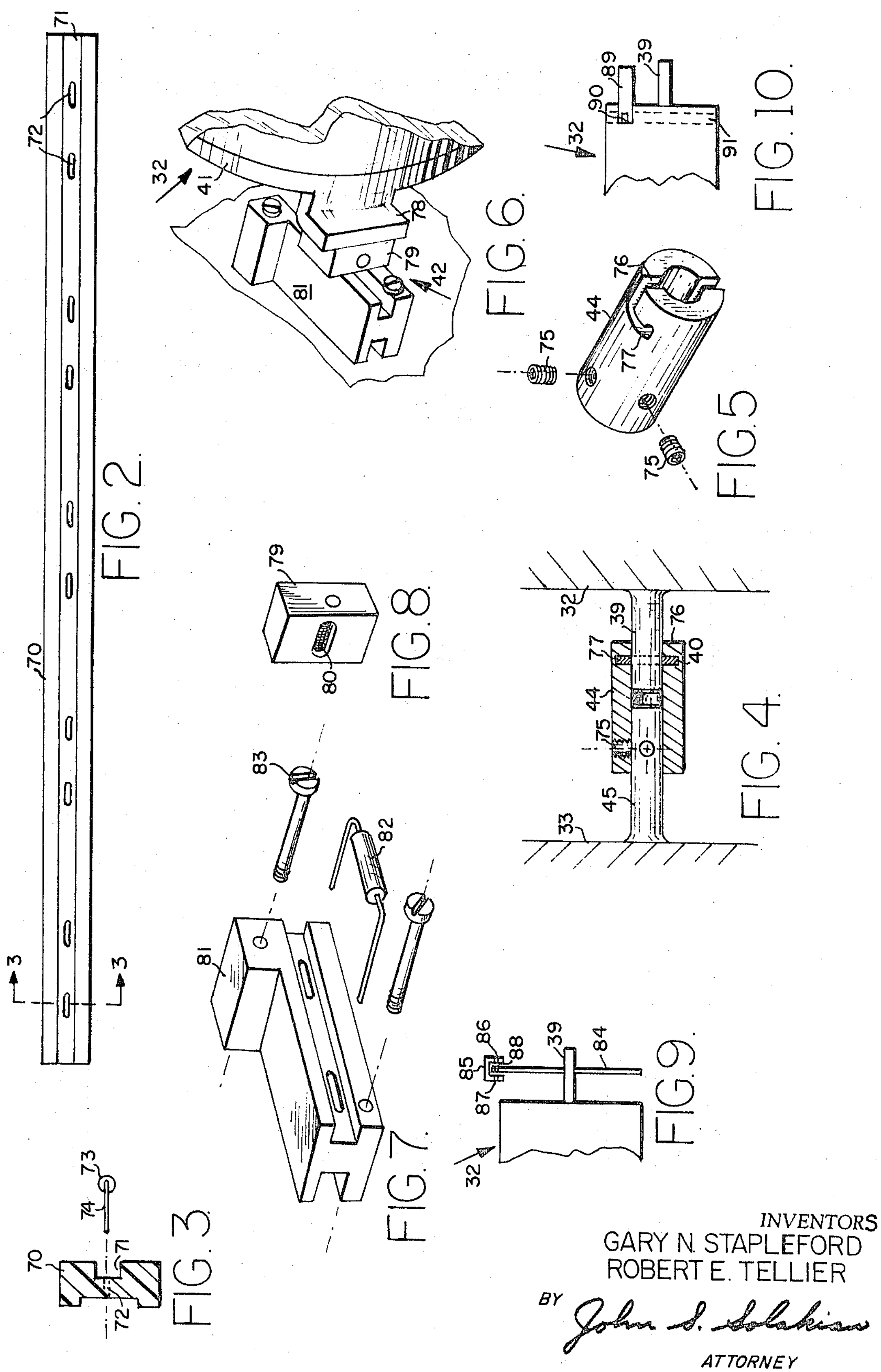
FIG. 2 is a detailed view of the data track carriage position indicator utilized in the embodiment shown in FIG. 1.
FIG. 3 is a cross-sectional view of the data track carriage position indicator illustrated in FIG. 2.
FIG. 4 is a cross-sectional view of the removable coupling between the magnetic drum and the drum drive motor of the apparatus of the invention.
FIG. 5 is a perspective view of the removable coupling shown in FIG. 4.
FIG. 6 is a perspective, detailed view of the zero position indicator of the magnetic drum storage apparatus generally shown in the view of FIG. 1.
FIG. 7 is a more detailed perspective view of the actuated mechanism of the zero position indicator in FIG. 6.
FIG. 8 is a detailed, perspective view of the magnet actuating assembly shown in the view of FIG. 6.
FIG. 9 illustrates a further embodiment for indicating the zero position of the drum of FIG. 1.
FIG. 10 illustrates still a further embodiment for indicating the zero position of the drum of FIG. 1 as well as indicating the data tracks on such drum.

Now referring to FIG. 2 the carriage position indicator assembly is illustrated. The bar 70 includes a groove 71 wherein holes are drilled in pairs 72, each pair accepting a magnetically actuable reed relay. The number of relays is limited by the length of the bar 70 and the size of the relays. As illustrated there are five such pairs 72 capable of accepting relays not shown. This would indicate that the track on magnetic material 38 may be separated into four equal segments. Of course more or less such segments of varying proportion may be so indicated.

FIG. 3 is a cross-sectional view of the assembly of FIG. 2 showing in more detail the mounting of the relay 73 with its leads 74. The relay 73 rests in the groove 71 of bar 70 and the leads 74 are inserted through the pair of holes 72. As stated before when the magnet 52 of the carriage 46 is in proximity with the relay 73, the relay 73 is actuated and the signal therefrom is electrically coupled to the associated circuitry utilized with the apparatus, thereby indicating the position of the carriage 46 with respect to the magnetic drum assembly 32. Depending on the instructions the movement of the carriage 46 may be limited to any length of the track disposed on magnetic material 38. It should be understood that this magnet and reed relay embodiment might be directly replaced in this embodiment by mechanical switches, wuch as those known by the trademark "MICRO SWITCH," mounted in the place of the relays and by a switch trip post mounted in place of the magnet.

Now referring to FIGS. 4 and 5 there is illustrated a more detailed view of the removable coupling 44. FIG. 4 illustrates the coupling in a cross-sectional view and FIG. 5 illustrates the coupling in a perspective view. Coupling 44 is shown in FIG. 4 attached to the drum drive motor shaft 45 by means of set screws 75. The shaft 39 of magnetic drum assembly 32 is inserted into the other end of coupling 44 and is secured to rotate with the shaft 45 by means of the doweled pin 40 secured within the confines of slot 76. The magnetic drum assembly 32 may be secured from additional movement by means of an additional slot 77 in coupling 44, wherein dowel pin 40 may be further rotated. The additional slot 77 is best shown in the perspective view in FIG. 5. When the magnetic drum assembly 32 is to be removed from the apparatus of the invention the set screws 75 are loosened the coupling 44 is moved toward the drum drive motor 33 and the drum assembly 32 is then also moved toward the drum drive motor 33 thereby releasing the other end of the drum assembly 32 from the ball bearing assembly 33 so that the drum assembly 32 may now be lifted out of the apparatus of the invention. It should be understood that there are many ways of accomplishing this removable coupling and that the illustration cited hereinabove is merely exemplary.

Now referring to FIG. 6 the drum assembly 32 zero position indicating assembly 42 is illustrated. Permanently attached to the collar 41 of cylinder 36 is a bracket 78 secured to which is a magnet assembly 79 which is best illustrated in the drawing of FIG. 8. Assembly 79 includes a magnet 80 attached thereto. Assembly 42 also includes a magnetically actuable reed relay and housing attached to support member 31. This reed relay 82 and housing 81 is best illustrated in the view of FIG. 7 wherein the relay 82 is attached to housing 81 in the same manner as relay 73 is attached to the bar 70 in the views of FIGS. 2 and 3. The housing 81 is attached to support member 31 by means of screws 83. When the magnet 80 is in proximity with the relay 82, a signal will be generated by the closure of relay 82 thereby indicating to the control electronics that the zero position of the drum assembly 32 is aligned thereto. It is particularly important to know the zero position in order to simplify the control electronics. That is, from the zero position, depending on the direction of rotation, track counting means in the control electronics may be incremented or decremented relative to the zero position thereby indicating the track number. That is, if a stepping motor is used each time a step is made the track number will be incremented or decremented.

Other embodiments for indicating the zero position of the drum assembly 32 are shown in FIGS. 9 and 10. In FIG. 9 there is illustrated an optical configuration for determining this zero position. Attached to the shaft 39 of drum assembly 32 is a disc 84 with a hole 88 cut therein at the zero position of the drum assembly 32. A bracket 85 holds a light source 87 and a light detector 86. When the drum assembly 32 is rotated, the disc 84 is also rotated and when the light source 87, hole 88 and light detector 86 are in alignment, the zero position will be indicated.

Now referring to FIG. 10 a further means for indicating the zero position of drum assembly 32 is shown. The magnetic material 38 placed or secured on drum assembly 32 may have a symbol stored thereon at the zero position of said assembly 32. Playback head 90 mounted to a bracket 89 might be utilized to detect and play back the zero position signal. In this case the playback head 90 would be placed contiguous to the magnetic material 38 as the drum assembly 32 rotates on its mounting rods 39. This zero indicating means might also be used to indicate the individual track numbers. That is, the track numbers may be stored as information along the the same track as the zero position is so stored. Thus, the track number may be read directly from the drum 32 itself rather than from the incremental movement of the step drive motor 33. This magnetic detection of the zero position might be necessary if a suitable means for placing the magnetic material 38 on the cylinder 36 is not devised. That is, if the magnetic material 38 is stored separately from the cylinder 36, then zero positioning of the magnetic material 38 on cylinder 36 would be required. Such other means for indicating the zero position of the drum assembly 32, where the magnetic material 38 was stored separately of the cylinder 36, might include the use of perforations in the magnetic material 38 which when inserted over cylinder 36 would be placed thereon so that the perforations of material 38 are in alignment with teeth attached to the cylinder 36 to accept such perforations, one of which teeth would be the zero indicator and which would be in registration with the perforation in the magnetic material 38 which also indicates the zero position.

As stated above, the means shown in FIG. 10 for indicating the zero position for the drum assembly 32 may also be utilized to indicate the individual track numbers on the drum assembly 32, i.e., on the same circumferential track on which the zero symbol was stored, there could also be stored track numbers. Playback head 90 would be in contiguous relationship with such track 91 and would send the track information as well as the zero position information directly back to suitable control electronics. Means might also be employed for moving playback head 90 away from the circumferential track 91 in order to reduce tape and head wear.

Once the zero position is known utilizing the embodiment of FIG. 10, the aforementioned track indicating scheme utilizing the stepping increments of drive motor 33 might be employed so that while the drive motor 33 is stepping, the need for a contiguous relationship of playback head 90 to track 91 would not be required. The combination of the relative or step positioning scheme as well as the tape indicating or direct positioning scheme might also be used, one for moving the head track by track and the other for rotating the drum assembly 32 where course positioning of such assembly 32 was desired.

Figures 11, 12:
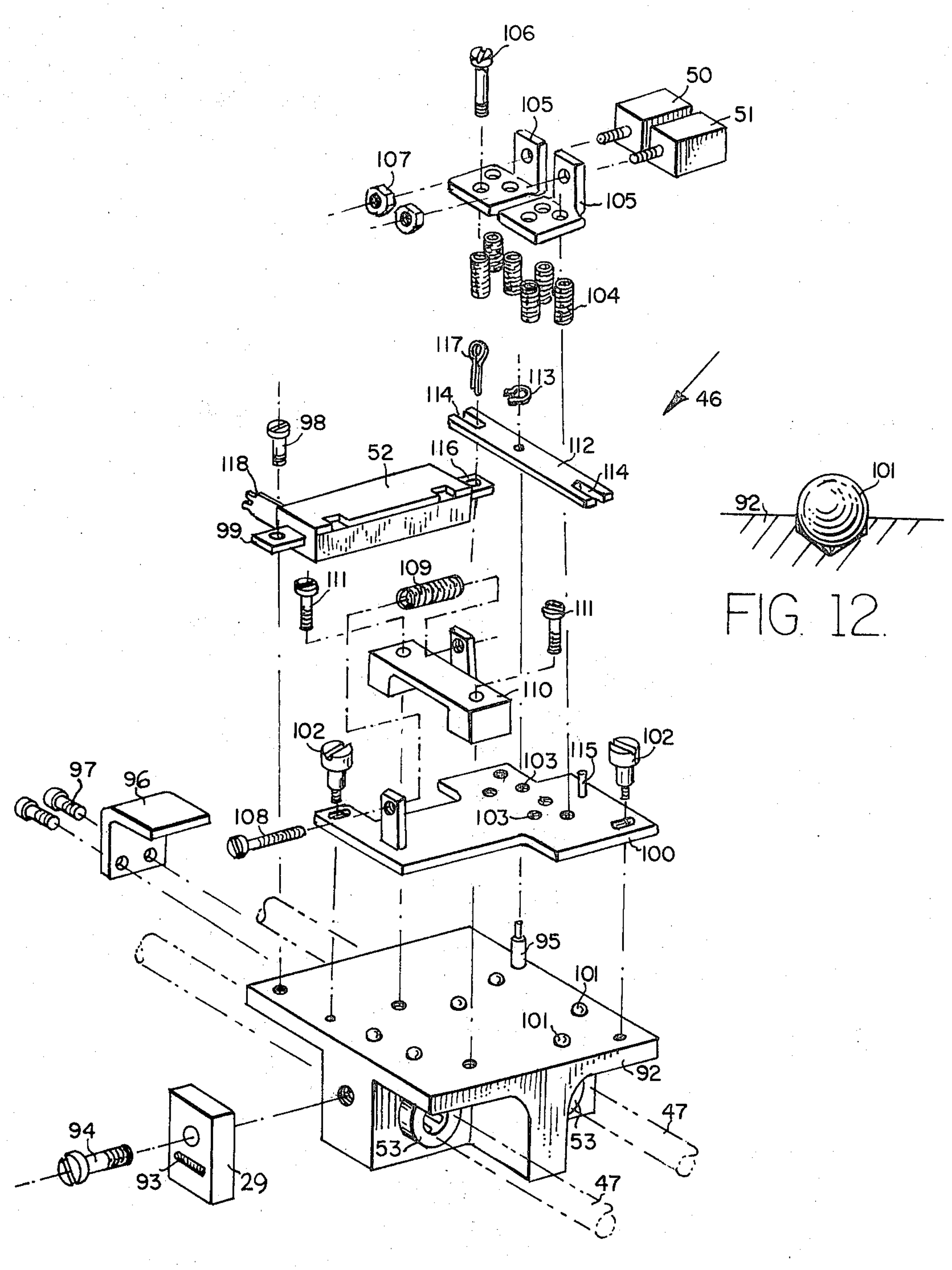
FIG. 11 is an exploded perspective view of the movable carriage assembly of the invention.
FIG. 12 is a more detailed view of a ball bearing support of the carriage assembly shown in FIG. 11.

Now referring to FIG. 11 there is illustrated a unique carriage 46 in an exploded perspective view. The carriage 46 includes a head transport 92 which houses linear ball bearing 53 which slide along the rods 47. Attached to that side of assembly 34 closest to the carriage position indicator assembly 35 is the magnet assembly 29 with magnet 93 secured thereto, all of which is secured to the transport 92 by a means of a screw 94. Magnet assembly 52 may be identical to magnet assembly 79 of FIG. 8. Also secured to transport 92 is a pivot 95 and a clamp 96 secured thereto with screws 97. Clamp 96 secures solenoid 52 to the transport 92 which solenoid 52 is additionally secured by a screw 98 through its flange 99. In sliding relationship with transport 92 is a plate 100 which lies on ball bearings 101, which ball bearings are placed on transport 92 as best illustrated by the view in FIG. 12. Plate 100 is held from vertical movement by screws 102.

Secured to the six holes 103 of plate 100 are six springs 104 and two brackets 105 by means of the six screws 106. Secured to brackets 105 are the erase head 50 and playback/record head 51 by means of nuts 107. The three point spring adjustment for each head allows each head to be tuneably positioned with respect to the magnetic material 38 of magnetic drum assembly 32. Also secured to plate 100 by means of screw 108 is a head return spring 109, the other end of which is secured to the head spring clamp 110 which clamp 110 is secured to transport 92 by means of screws 111. The spring 109 is compressed when the heads 50 and 51 are in contiguous relationship with the magnetic material 38. Upon the energization of the solenoid 52 the spring 109 acts to spring the heads back from such contiguous relationship. The solenoid 52 is connected to the heads 50 and 51 by means of the pivot 95 mounted on transport 92, attached to which is pivot arm 112 secured thereto by a retaining spring 113. At each end of pivot arm 112 are slots 114, the nearest slot of which is overlapped with pin 115 of plate 100. The other or furthest slot 114 is secured to the actuator 116 of solenoid 52 by means of a pin 117.

With the solenoid 52 deenergized, head return spring 109 is in its normal state and the heads 50 and 51 are pulled back from the magnetic material 38. When solenoid 52 is energized, solenoid actuator 116 moves rearward or back into the solenoid 52 so that the pivot arm 112 attached thereto moves the plate 100 forward towards the magnetic drum assembly 32 thereby causing the heads 50 and 51 to come into contiguous relationship with the magnetic material 38. As the plate 100 moves forward, head return spring 109 becomes compressed since it is secured at one end to clamp 110 which is secured to transport 92 and the other end is secured to the plate 100. When the solenoid 52 is deenergized, the compressed spring 109 releases its energy and causes the plate 100 to move backwards so that the heads 50 and 51 are moved away from the drum assembly 32. Electrical connection between the control electronics and solenoid 52 is provided by terminals 118.

It should be understood that the unique design of carriage 46 is exemplary and that other designs are possible in order that these functions of carriage 46 be provided. In summary, such functions are the sliding of the carriage 46 on the rods 47, the three point adjustment of each of the heads 50 and 51, and the positioning forward and rearward from the drum assembly 32 of the heads 50 and 51.

Figure 13:
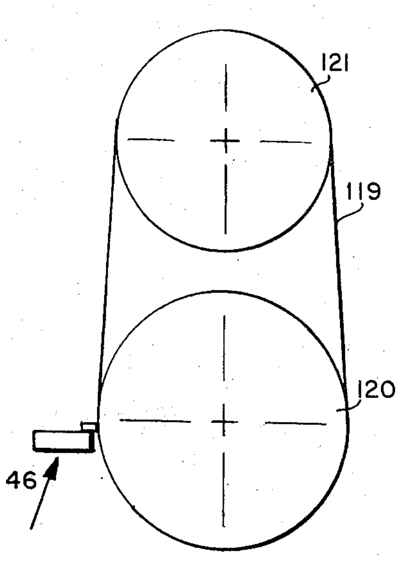
FIG. 13 illustrates in block diagram form an alternative embodiment employing a double drum and endless magnetic belt arrangement.

Now referring to FIG. 13, an alternative embodiment of the apparatus of the invention is illustrated wherein the magnetic material 38 now takes the shape of an endless magnetic belt 119 which is positioned about two cylinders 120 and 121, each of which cylinders may be of the same or different diameters. One of these cylinders, preferably cylinder 121, should be capable of vertical movement for ease of insertion of belt 119. In such case the cylinder 121 will be lower than is shown when belt 119 is inserted. After insertion, the cylinder 121 would then be raised to provide the proper tension on the belt 119. Carriage 46 is also shown in contiguous relationship with the belt around drum 120, but it should be understood that carriage 46 could be placed in contiguous relationship with the magnetic belt 119 around cylinder 121, or in the alternative carriage 46 might have been placed against the belt 119 somewhere near its mid-point with a pressure pad placed on the back side thereof. This last alternative for the location of the carriage 46 would probably be less expensive for the overall construction since the pressure pad associated therewith would have to be no bigger than a strip, whereas otherwise the pressure pad would have to take the shape of the drum assembly 32 previously discussed such that the pressure pad would now have to be located around the cylinder associated with the carriage 46.

Figure 14:
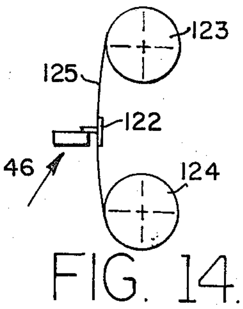
FIG. 14 illustrates in block diagram form an alternative embodiment employing a double drum arrangement.

Now referring to FIG. 14, this substantially mid-point placement of the carriage 46 with pressure pad 122 is illustrated. However, in this embodiment of FIG. 14 cylinders 123 and 124 of like or different diameters secure the ends of magnetic belt 125 which in this embodiment is not endless. It should be understood that the carriage mechanism, driving motor mechanisms, home position indicators, as well as the track position indicators for the embodiments of FIG. 13 and FIG. 14 as well as the embodiment of FIG. 15 may be substantially the same as that embodiment of the invention as discussed in relation to FIG. 1.

Figure 15:
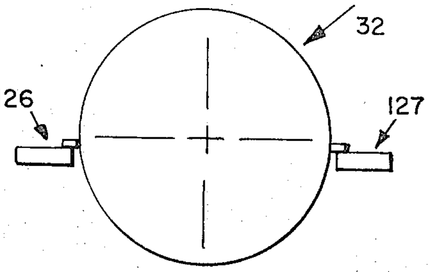
FIG. 15 illustrates in block diagram form an alternative embodiment of the invention employing an arrangement utilizing parallel carriage assemblies.

Now referring to FIG. 15, there is illustrated a magnetic drum assembly 32 having a double carriage arrangement as indicated by carriage assemblies 126 and 127, which assemblies are similar to carriage assembly 34 illustrated in FIG. 1. Carriages 126 and 127 are spaced 180 degrees apart around the drum assembly 32 and are proximate to the magnetic material 38. Both carriages are moved simultaneously in the same direction so that two tracks of information may either be stored or played back on or from drum assembly 32 at the same time. One application of this dual carriage mode might be the simultaneous playback or recording of digital information on one track and voice or analog information on the other track. Voice information might be heard via an amplifying and speaker arrangement.

In the alternative, carriages 126 and 127 may move alternately, i.e., as carriage 126 is recording or playing back, carriage 127 might be returning to its initial position after it has recorded or played back. Then when carriage 126 reaches the end of its track, carriage 127 would be energized and start its travel to the end of its track. Although this alternate mode of carriage operation might increase logic required for recording and timing, advantages associated therewith are that the effective track length is made infinitely longer, i.e., the track length may be made as long as there is room for tracks on the magnetic tape material. In this alternate arrangement, one carriage might start at its initial position on one end while the other carriage might start at its initial position on the other end in order that the same carriage drive motor be used. However, the same carriage drive motor may be used even though the carriage start at the same end of the drum assembly 32. In this latter configuration, the carriages would have to be connected to the carriage drive motor in a reverse coupling, i.e., the cord such as cord 60 in FIG. 1 securing the carriage to the drive motor would have to be wound clockwise for one carriage and counterclockwise for the other carriage.

It should be understood that the configuration shown in FIG. 15 wherein the dual carriage arrangement is illustrated might also be used in the configuration of FIG. 13 wherein an endless belt 119 is used. That is, in the embodiment of FIG. 13 a dual carriage arrangement might have also been used.

Figure 16:
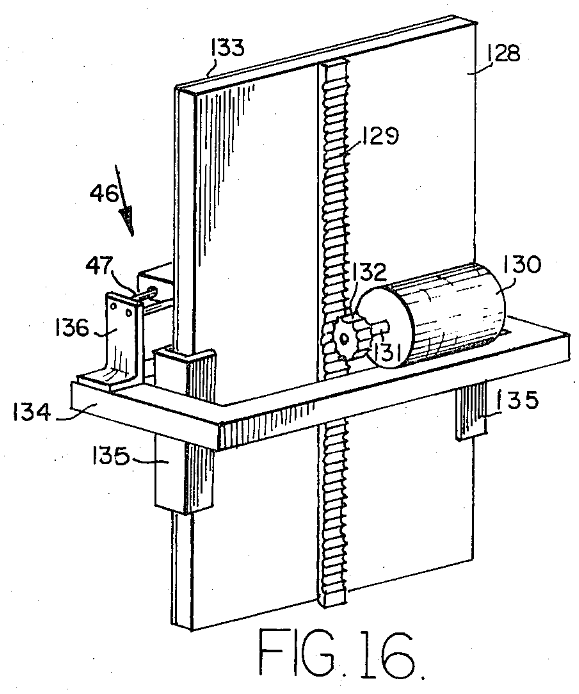
FIG. 16 illustrates in perspective view a magnetic tape board embodiment of the invention.

Now referring to FIG. 16, a further embodiment of the apparatus of the invention is illustrated. In this embodiment a flat board is used to house the magnetic material. The board 128 includes a gear belt 129 attached thereto, which gear belt may be located at any position on the back side of board 128 so long as the gears are arranged to drive board 128 in the vertical direction. The driving means is a drive motor 130 to whose shaft 131 is attached a gear 132 in engagement with the gear belt 129. Board drive motor 130 is addressed in the same manner as was discussed with regard to drum drive motor 33 in FIG. 1. On the front side or rear most side of board 128 as illustrated is placed a layer of magnetic material 133 which material may have data tracks thereon, said tracks being placed in the horizontal direction.

Mounted to a base 134 are guide members 135 which support the board 128 from movement away from the gear 132. Also attached to base 134 are support members 136 which support the carriage rods 47 upon which carriage 46 is arranged for movement. Operation of the embodiment shown in FIG. 16 is similar to the operation of the embodiment of FIG. 1 except that rather than rotating a drum, a flat board is moved vertically. The zero position of the board 128 may be indicated in any manner as previously discussed hereinabove for the magnetic drum assembly 32. The magnetic material 133 of the embodiment of FIG. 16 being flat has the advantage in that more information may be stored in the same volume of storage space, this being so whether or not magnetic material 133 is removable from the board 128.

In each of the embodiments mentioned above, alternate information tracks may be composed of storing information in opposite directions. Thus when the carriage scans with its transducers energized from the beginning of a first track to the end thereof, the very next track may be so scanned by merely stepping the drum to the next track and scanning the carriage from the start of this next track (same point axially as the end of the first track) to the end thereof (same point axially as the beginning of the first track). The carriage return assembly would therefore not have to be used, rather a reversible carriage drive motor arrangement would be utilized.

Figure 17:
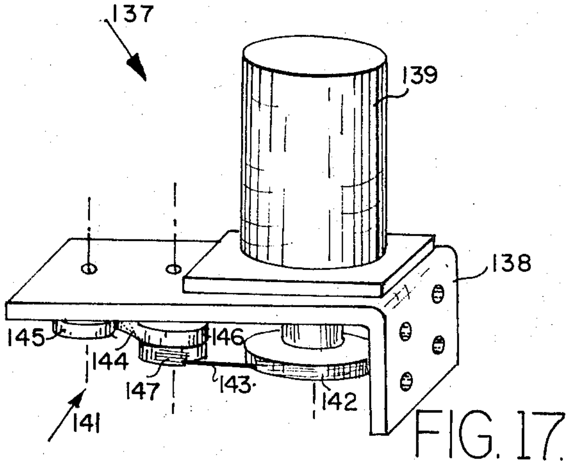
FIG. 17 illustrates a perspective view of an alternative carriage drive arrangement of the apparatus shown in FIG. 1.
Figure 18:
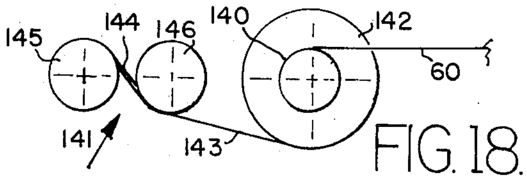
FIG. 18 is a schematic diagram of the driving mechanism illustrated in FIG. 17.
Figure 19:
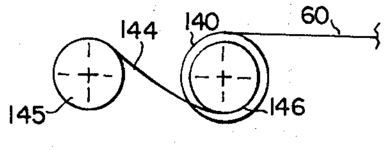
FIG. 19 is a schematic diagram of an alternative arrangement of the driving arrangement shown in FIG. 17.

Now referring to FIG. 17, as well as FIGS. 18 and 19, there is illustrated an alternative apparatus for driving the carriage 46. This alternative carriage drive assembly 137 replaces the carriage drive assembly 49 in FIG. 1 and is mounted in the location on side support member 31 where idler 61 and hole 62 had previously been located in FIG. 1. Such mounting is made by means of bracket 138 which has a drive motor 139 mounted thereto. Drive motor 139 may be either of the linear type or may be of the stepping type, the stepping type being similar to the stepping type drum drive motor 33 illustrated in FIG. 1. By utilizing a drive motor of the stepping type for motor 139 the position of carriage 46 along the drum assembly 32 may be ascertained in the same manner as the track number of the drum assembly 32 is ascertained, i.e., by determining the zero or initial position of the carriage assembly 34 and then counting the steps that the drive motor 139 has made.

The drive motor 139 is coupled to the carriage 46 by means of a cord 60 whose other end is tied to a pulley 140 on the shaft of the motor 139. When carriage 46 is in its initial position, the cord 60 is unwound from the pulley 140. When the carriage 34 has completed its full travel across the drum assembly 32, pulley 140 has now taken up the entire cord 60. When the drive motor 139 is deenergized the carriage return spring assembly 48 illustrated in FIG. 1 pulls the carriage 46 back to its initial position.

Because the drive motor 139 is not free wheeling when it is deenergized, i.e., its shaft is not free to turn with ease the spring 69 of assembly 48 would have to be designed to produce a higher constant torque than was shown in the embodiment for FIG. 1. In the alternative, assembly 48 may retain the same torque requirement as discussed for the embodiment of FIG. 1 but in addition an assembly similar to assembly 48 should be utilized in conjunction with the drive motor 139 thereby substantially eliminating the residual or opposing torque of motor 139 in the deenergized state. Accordingly, a unique residual torque reduction assembly 141 is thus shown connected to an additional pulley 142 which is connected to the shaft of drive motor 139. The constant tension "NEGATOR" spring 144 of reduction assembly 141 is shown wound between pulleys 145 and 146 also of assembly 141. A pulley 147 rotates with pulley 146 and holds one end of a nylon cord 143, the other end of which cord 133 is connected to pulley 142. With the carriage 46 at the initial position, cord 60 is unwound from pulley 140, cord 143 is wound up completely on pulley 147 and constant torque spring 144 is wound up completely on pulley 145.

Drive motor 139 rotates pulley 142 in the counter clockwise direction as it pulls the carriage 46 toward it. When the carriage 46 is now in its left hand most position or at the end of the data track, cord 60 is fully wound on pulley 140, cord 143 connecting pulley 147 and pulley 142 is now completely wound on pulley 142. The constant torque spring 144 is now wound completely on pulley 146 in a direction which is opposite to its natural coiling bias. When drive motor 139 is deenergized, the spring 144 tends to rotate the shaft of drive motor 139 in the clockwise direction whereas the carriage return spring assembly 48 drives the carriage 46 via cord 63 to its initial position. Accordingly, the residual torque of deenergized motor 139 is eliminated and the carriage assembly 34 is returned to its initial position at a constant velocity. It should be reemphasized at this point that the constant torque spring return assembly 48 allows drive motor 139 to pull carriage 46 toward it, utilizing a constant torque throughout the travel thereof. Unless this constant torque mechanism is used, the drive motor 139 in this embodiment as well as the assembly 49 in the embodiment of FIG. 1 would have had to have included a higher torque motor therewith since the torque required to pull the carriage 46 would increase as the carriage 46 moved closer and closer to the end of the data track.

In an alternative embodiment of the configuration of FIG. 17 and FIG. 18, there is shown in FIG. 19 a means for eliminating the requirement for cord 143 as well as pulleys 142 and 147. This is accomplished by mounting pulley 146 on the shaft of drive motor 139, which has also mounted thereto the pulley 140 housing cord 60. Pulley 146 would hold one end of the spring 144 and the other end would be tied to pulley 145 as stated hereinabove for the embodiment of FIG. 17 and FIG. 18. Operation of the embodiment of FIG. 19 would be identical, wherein the spring 144 would be completely wound on pulley 145 when the carriage 46 is in its initial position and when carriage 46 has reached its final position or end of travel, spring 144 would be completely wound on pulley 146. Accordingly, when the motor 139 is deenergized, spring 144 would tend to rotate the shaft of motor 139 in the clockwise direction thereby eliminating the residual torque of the deenergized motor 139.

Figure 20:
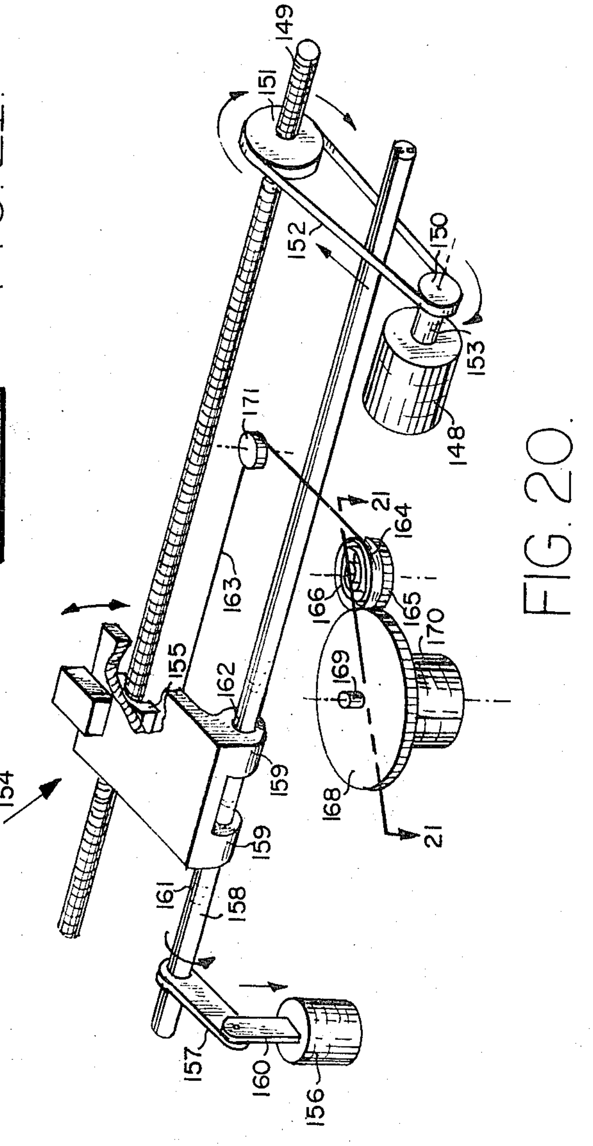
FIG. 20 is a perspective view of an alternative embodiment of the carriage drive and carriage position indicating means of the invention.

Now referring to FIG. 20, there is shown an alternative embodiment of the apparatus shown in FIG. 1. In this configuration a carriage drive motor 148 rotates a male lead screw 149 by means of pulleys 150 and 151 and belt 152. Pulley 150 is connected to the shaft 153 of drive motor 148. The lead screw 149 allows the carriage assembly 154 to move from its initial position to the end of the data track. This is accomplished by means of a receptive female lead screw 155 connected to the bottom of the carriage 154. Lead screw 155 remains in engagement with lead screw 149 and therefor travels from right to left as shown in the illustration so long as the solenoid 156 remains deenergized.

Solenoid 156 is coupled to a carriage 154 by means of connector arm 157 and rod 158. Rod 158 is attached to receptive means 159, also connected to the underside of carriage 154. Arm 157 is permanently secured to rod 158. The other end of arm 157 is tied to actuator 160 of solenoid 156. When solenoid 156 is energized, actuator 160 moves inward of the solenoid 156 as indicated by the arrow and connector arm 157 imparts a counter clockwise motion to rod 158 also indicated by the direction of an arrow. This rotation of rod 158 lifts the carriage 154 at the lead screw 155 connection from lead screw 149 so that carriage 154 is free to return to its initial position. Rod 158 imparts this motion to carriage assembly 154 since the rod 158 has a slot 161 cut therein which slot is adapted to receive pivot pins 162 on receptive means 159. This arrangement allows carriage 154 to move along the rod 158 while still allowing such assembly to pivot thereon.

Figure 21:
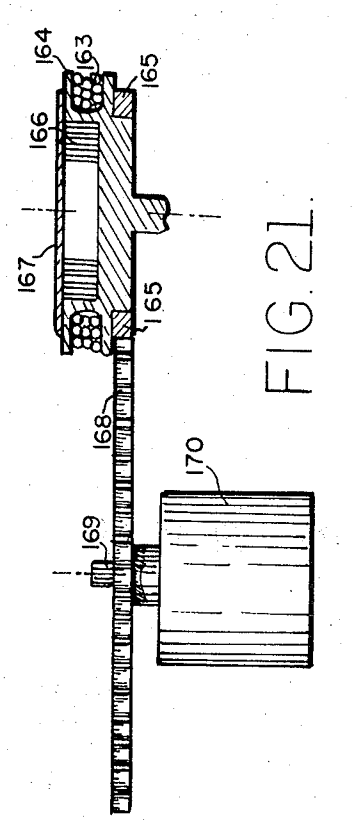
FIG. 21 is a cross-sectional view of the carriage position indicating means shown in FIG. 20.

Returning the carriage assembly 154 to its initial position is a cord 163 connected to a pulley 164, which pulley 164 has a gear 165 attached thereunder. In the inside housing of pulley 164 is a coiled spring 166 held in place by a cover 167 as is best shown in the cross sectional view of FIG. 21. Gear 165 is coupled to gear 168 which gear 168 is attached to the shaft 169 of a potentiometer 170. Potentiometer 170 is utilized to indicate the position of the carriage assembly 54 along the lead screw 149. The number of address points of the carriage 154 which this arrangement can generate is infinite as compared to the incremental indications determinable by carriage position indicator assembly 35 shown in FIG. 1. It should be understood that this potentiometer arrangement may be utilized with the embodiment as shown in FIG. 1 as well as the other embodiments discussed hereinbefore without utilizing the remaining embodiments of FIG. 20.

The spring 166 and housing thereof are shown here in illustration as the mechanism for returning the carriage assembly 154 to its initial position. It should be understood that this spring 166 does not produce a constant torque in both directions of travel of the carriage 154 but is shown here as an alternative embodiment of the constant torque spring return housing assembly 48 illustrated in FIG. 1. It should be further understood that the assembly 48 shown in FIG. 1 could replace the spring arrangement shown in the embodiment of FIG. 20.

In operation therefor, the drive motor 148 which may be of the linear or of the stepping type moves the carriage 154 along the lead screw 149 so long as solenoid 156 is deenergized. When solenoid 156 is energized, the assembly 154 may then return to its initial position. It should be noted that drive motor 148 may remain energized at all times. With carriage 154 free to return to its initial position, cord 163 coupled to pulley 164 via idler 171; in combination with the helical spring 166, causes the carriage 154 to return to its initial position. As the carriage 154 returns to its initial position, potentiometer 170 rotates in the counter clockwise direction and might be set so that when the carriage 154 is at its initial position the potentiometer 170 will also be at its zero position. Of course, as the carriage 154 moves along its track from the right to left, potentiometer 170 rotates in the clockwise direction and accordingly could indicate its highest resistance or voltage when it reaches the end of its travel.

It should also be noted that helical spring 166 is unwound when the carriage 154 is at its initial position and that when carriage 154 reaches the end of its travel, spring 166 then becomes tightly wound. When carriage 154 is free to return to its initial position, spring 166 by suitable connections becomes unwound as it pulls carriage 154 to its initial position. It should be noted that in the embodiment of FIG. 20 the carriage 154 is substantially the same as the carriage 46 indicated in FIG. 1 and in FIG. 11 except that the lead screw 155 and receptive means 159 are attached thereto.

It should also be understood that the transducers or erase head 50 and playback/record head 51 may actually include the provision for recording or playing back information in more than one track. That is, the heads may be of the multiple track type. For example, heads 50 and 51 may include as much as four subheads, for example, for recording or playback of four tracks of information either simultaneously or independently depending upon the connection of the control electronics. That is, with this multiple track capability, one track may include digital information whereas another track might include analog information, and so on, thereby increasing the possible configurations and applications of the apparatus of the invention. Such a multiple track feature might be included in any of the embodiments discussed hereinabove. Further discussion of this multiple track capability as well as the control electronics mentioned hereinbefore will now be discussed with regard to the illustration in FIG. 23.

Figure 22:
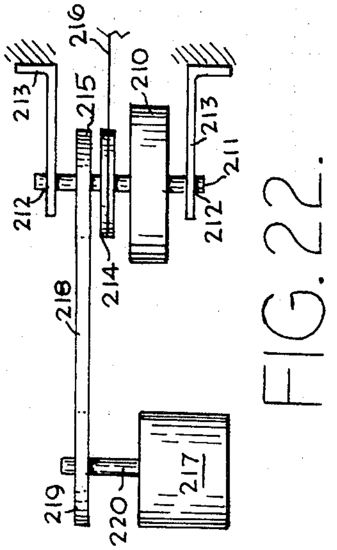
FIG. 22 is a schematic diagram illustrating the application of a flywheel in combination with the carriage drive embodiments of the invention.

Now referring to FIG. 22, there is illustrated an arrangement of a flywheel in combination with the carriage drive assemblies illustrated in FIG. 1 as assembly 49 and in FIG. 17 as assembly 137. This flywheel arrangement might also be used in the embodiment shown in FIG. 20. The flywheel is used to equalize the energy exerted and the work done and thereby prevents excessive or sudden changes of speed in the movement of the carriage coupled to the carriage drive motor. That is, the flywheel arrangement removes or isolates vibration which might otherwise be transmitted to the carriage by integrating any such vibration. More particularly, the flywheel 210 is shown mounted to rotate with a shaft 211 which is rotatably mounted preferably on bearings 212 to a bracket 213. Bracket 213 is mounted in the approximate position of idler 61 on support member 31 both shown in FIG. 1. Also mounted to shaft 211 are two pulleys 214 and 215. Pulley 214 has wound thereon a cord 216 which is connected at its other end to the carriage. The other pulley 215 is used to connect the shaft with pulley 214 and flywheel 210 thereon to the carriage drive motor 217. The connection is made by an endless belt 218 looped at one end around pulley 215 and at its other end around pulley 219 secured to the shaft 220 of motor 217.

Figure 23:
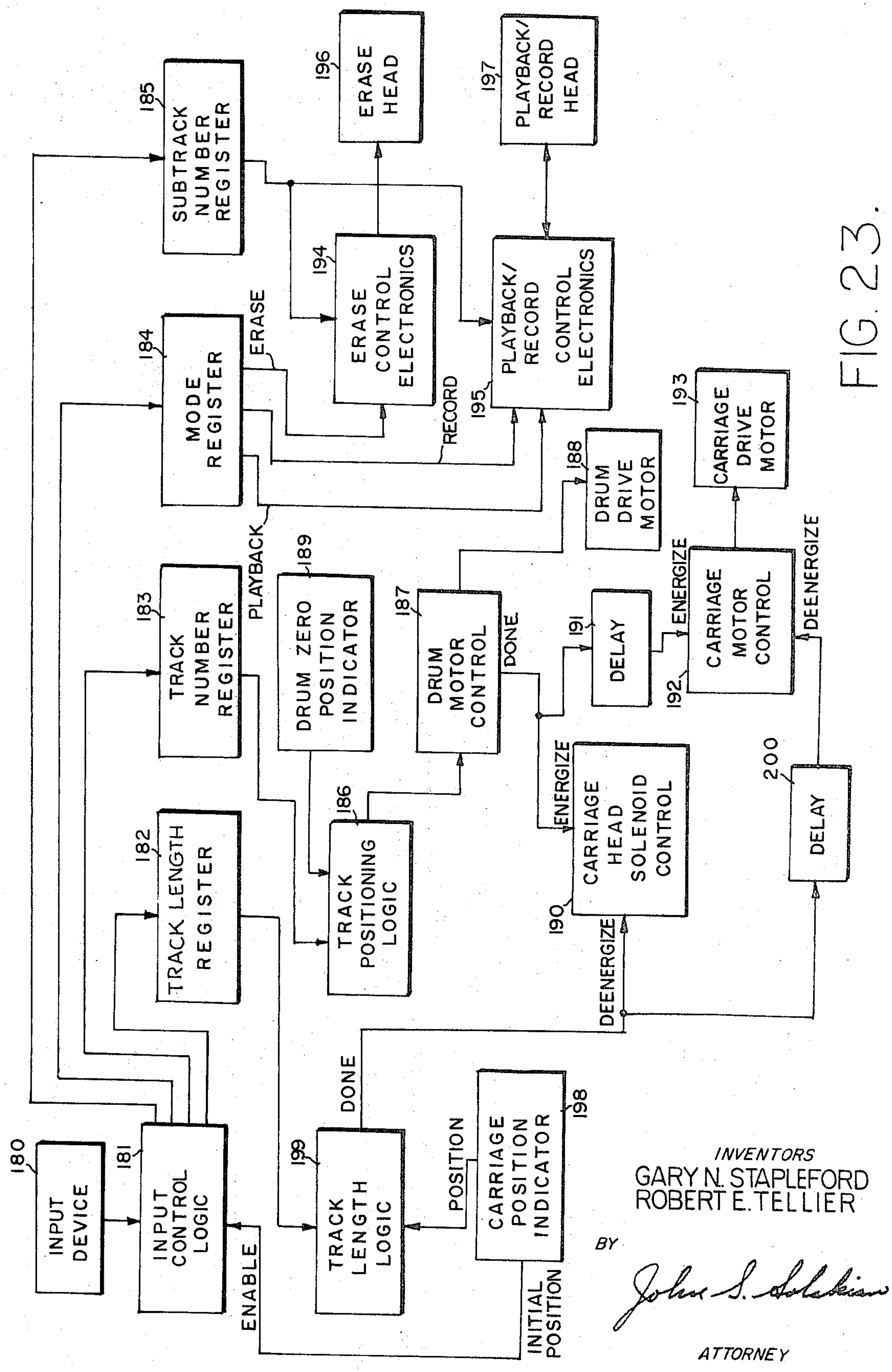
FIG. 23 is a schematic block diagram of the control circuitry utilized in combination with the apparatus of the invention.

Now referring to the illustration of FIG. 23, there is illustrated a schematic block diagram of the control electronics utilized in conjunction with the magnetic drum apparatus of the invention. Generally, an input device 180 is connected to the control electronics illustrated. This input device 180 may be a keyboard, a computer, a display system, etc. Information generated by input device 180 includes the track number, the track length, the mode, i.e., either playback or record, and if the heads are capable of multiple track operation, then the subtrack number. Once this information is received by the control electronics, the drum drive motor positions the drum assembly to the correct track, the transducers are then engaged in contiguous relationship with the drum assembly magnetic material. Once this is done the carriage is driven along the track. As the carriage is driven along the track; the track position is sensed and when the track position and the track length designed are in agreement a signal is generated thereby pulling back the transducers from the contiguous relationship with the magnetic material after which the carriage drive motor is deenergized so that the carriage is free to return to its initial position. When the initial position is reached, the appropriate circuitry is reset as required. Control electronics in association with both the erase head and the playback/record head are utilized to control whether such heads are activated, and if such heads include a multiple track capability, then which track or tracks are so activated.

More particularly input device 180 transfers its contents through input control logic 181 when such logic 181 is enabled. Input control logic 181 is enabled each time the carriage assembly is at its initial position. This information is then loaded into the respective registers by suitable stroke pulses, not shown. That is, the track length information is loaded into register 182, the track number is loaded into register 183, the mode indication is loaded into register 184 and the subtrack number, if any, is loaded into register 185. The track number now stored in register 183 is loaded into track positioning logic 186. The presence of this track number in logic 186 energizes drum motor control 187 which in turn increments drum drive motor 188 to the designated track number. Track positioning logic 186 in combination with drum zero position indicator 189 functions to determine the difference between the present track number desired, the zero position of the drum, as well as the track number at which the drum had been previously located; and generates a control signal so as to rotate the drum in either the clockwise or counterclockwise direction depending upon the shortest route to the desired track number. Once the drum is positioned to the correct track a DONE signal is generated by the drum motor control 187 and energizes the carriage head solenoid control 190 so as to place the transducers in contiguous relationship with the drum assembly magnetic material. After the transducers are so engaged and after a short delay via delay 191, the DONE signal from drum motor control 187 also energizes the carriage motor control 192 which in turn energizes the carriage drive motor 193 so as to pull the carriage assembly along the track of the magnetic drum assembly.

Simultaneously, the erase control electronics 194 and the playback/record control electronics 195 which control the erase head 196 and playback/record head 197 respectively, are placed in the proper mode of operation by means of the signals erase, record and/or playback from mode register 184. Usually, if the record mode is desired the erase signal will also be present. If the playback mode is desired the erase signal will not be present. If heads 196 and 197 also include a multiple head capability the subtrack number which represents one of the multiple heads will be transferred to the control electronics 194 and 195 thereby directing the contents of mode register 184 to the proper subtracks of the multiple heads in heads 196 and 197.

While the carriage assembly is moving away from the initial position along the track on the drum assembly, the carriage position indicator 198 checks the position and transfers this position signal to the track length logic 199. Another input to track length logic 199 is the output of track length register 182. When the track length stored in register 182 is equal to the position indicated by the carriage position indicator 198 the track length logic 199 will generate a DONE signal thereby energizing carriage head solenoid control 190 so that the heads 196 and 197 are moved away from the magnetic material of the drum assembly. After a delay via delay 200, the carriage motor control 192 is also deenergized so that the carriage is free to return to the initial position by means of the carriage head spring return assembly. Once the carriage has returned to its initial position the input control logic 181 will be enabled thereby allowing the system to accept another instruction from input device 180.

It should be understood that when dual carriages are utilized suitable electronics similar to the above-described electronics are utilized in combination as required. It should also be understood that the control electronics functions described may be provided by various circuit arrangements well known in the art.

It will thus be seen that the objects set forth above among those made apparent from the preceding description are efficiently attained and since certain changes may be made in the above construction without departing from the scope of the invention it is intended that all matter contained in the above description or shown in the accompanying drawings shall be interpreted as illustrative and not in a limiting sense.

Having described the invention what is claimed as new and secured by Letters Patent is:

1. Information storage apparatus comprising:

a drum having an outer surface of magnetic material on which information is adapted to be stored in a plurality of information tracks which are parallel to the drum axis;

a record/playback transducer means arranged for movement along the periphery of said drum in an axial direction at a record/playback station which extends along the axial length of said tracks, drum drive motor means for rotating said drum about its axis so as to selectively present said information tracks to said record/playback station for finite time periods, means for moving said transducer means from an initial position along said axial direction during said time periods, said moving means including carriage guide means extending along said record/playback station in said axial direction;

a carriage upon which said transducer means is mounted, said carriage being arranged on said guide means for travel in said axial direction;

carriage drive motor means for moving said carriage from an initial position along said guide means during said time periods;

means for returning said carriage to its initial position after said carriage has completed its travel during said time periods; and means for indicating the position of said carriage along said guide means;

means for returning said transducer means to said initial position; and record/playback means coupled to said transducer means and operative during said time periods to record or play back information on or from said tracks.

2. Apparatus as defined in claim 1 wherein said indicating means includes:

A. a magnet mounted to said carriage; and

B. magnetically actuable switches mounted at selected positions parallel to the movement of said carriage such that the proximity of said magnet to any of switches causes said switches to be actuated thereby generating a carriage position signal which signal further indicates the position of said transducer means on a selected one of said plurality of information tracks.

3. Apparatus as defined in claim 2 wherein first and second ones of said switches are mounted at positions indicative of said initial position, which initial position indicates the beginning of said plurality of information tracks, and indicative of the end position of said plurality of information tracks.

4. Apparatus as defined in claim 3 wherein others of said switches are further mounted at selected positions between said initial position and said end position.

5. Apparatus as defined in claim 2 further including:

A. means adapted to receive a track length number indicating the portion along a selected one of said plurality of information tracks which said carriage is to move;

B. means for energizing said carriage drive motor means when said carriage is positioned at said initial position; and C. means for deenergizing said carriage drive motor means when said carriage has moved said portion indicated by said track length number as signaled by the actuation of a corresponding one of said switches.

6. Apparatus as defined in claim 1 wherein said indicating means includes:

A. variable resistance means; and

B. means for mechanically coupling the movement of said carriage to said variable resistance means whereby the resistance of said variable resistance means varies between selected percentages of the total resistance of said variable resistance means as said carriage moves along said guide means.

7. Information storage apparatus comprising:

a drum having an outer surface of magnetic material on which information is adapted to be stored in a plurality of information tracks which are parallel to the drum axis;

a record/player transducer means arranged for movement along the periphery of said drum in an axial direction at a record/playback station which extends along the axial length of said tracks, drum drive motor means for rotating said drum about its axis so as to selectively present said information tracks to said record/playback station for finite time periods, means for moving said transducer means from an initial position along said axial direction during said time periods, said moving means including
carriage guide means extending along said record/-playback station in said axial direction;
a carriage upon which said transducer means is mounted, said carriage being arranged on said guide means for travel in said axial direction;
carriage drive motor means for moving said carriage from an initial position along said guide means during said time periods;
means for returning said carriage to its initial position after said carriage has completed its travel during said time periods; and
means for returning s,id transducer means to said initial position;
record/playback means coupled to said transducer means and operative during said time periods to record or play back information on or from said tracks; and
means for indicating a zero position of the rotation of the drum including:
A. a disc rotatably mounted with said drum, said disc having a hole in registration with said zero position;
B. a light source arranged on one side of said disc and in alignment with said hole once for each revolution of said drum; and
C. light detector means arranged on the other side of said disc and in alignment with said light source whereby a zero position signal is generated when said hole passes between said light source and said light detector means.

8. Information storage apparatus comprising:
a drum having an outer surface of magnetic material on which information is adapted to be stored in a plurality of information tracks which are parallel to the drum axis;
a record/playback transducer means arranged for movement along the periphery of said drum in an axial direction at a record/playback station which extends along the axial length of said tracks,
drum drive motor means for rotating said drum about its axis so as to selectively present said information tracks to said record/playback station for finite time periods,
means for moving said transducer means from an initial position along said axial direction during said time periods, said moving means including
carriage guide means extending along said record/-playback station in said axial direction;
a carriage upon which said transducer means is mounted, said carriage being arranged on said guide means for travel in said axial direction;
carriage drive motor means for moving said carriage from an initial position along said guide means during said time periods;
means for returning said carriage to its initial position after said carriage has completed its travel during said time periods;
means for returning said transducer means to said initial position;
record/playback means coupled to said transducer means and operative during said time periods to record or play back information on or from said tracks; and
means for indicating a zero position of the rotation of the drum including
A. a zero position indicator signal in registration with said zero position, said signal stored on said magnetic material at one end of said drum in a track which is disposed circumferentially on said drum; and
B. second transducer means positioned in proximity with said circumferential track for playback of said zero position indicator signal once for each revolution of said drum.

9. Apparatus as defined in claim 8 wherein said circumferential track also includes signals stored therein indicating the track number of each of said plurality of axially aligned information tracks, whereby said second transducer means is additionally used to play back said track numbers.

10. Apparatus for storing information, said apparatus comprising:
A. a base;
B. first and second cylinders rotatably mounted on their respective axes to said base, said cylinders being spaced apart with their respective axes substantially parallel to each other, and said cylinders having an endless magnetic belt positioned around the cylinders for rotation therewith, wherein said information is stored in a plurality of information tracks which are substantially parallel to said axes;
C. a carriage including transducer means for recording and playing back information on said belt;
D. means for rotating said cylinders so that said transducer means is in substantial alignment with a selected one of said tracks;
E. carriage guide means mounted to said base and positioned so that movement of said carriage is substantially parallel to and said transducer means is proximate to said selected one of said tracks;
F. carriage drive motor means for moving said carriage from an initial position along said guide means;
G. means for returning said carriage to said initial position after said carriage has completed its movement along said guide means;
H. a second carriage including second transducer means for recording and playing back information on said belt;
I. second carriage guide means mounted to said base and positioned so that movement of said second carriage is substantially parallel to and said second transducer means is proximate to another selected one of said plurality of information tracks;
J. second carriage drive motor means for moving said second carriage from a first position along said second guide means; and
K. second means for returning said second carriage to said first position after said second carriage has completed its movement along said second guide means.

11. Information storage apparatus comprising:
a base;
a drum mounted upon said base and having an outer surface of magnetic material on which information is adapted to be stored in a plurality of information tracks which are parallel to the drum axis;
a record/playback transducer means arranged for movement along the periphery of said drum in an axial direction at a record/playback station which extends along the axial length of said tracks, drum drive motor means mounted upon said base for rotating said drum about its axis so as to selectively present said information tracks to said record/-playback station for finite time periods, means for moving said transducer means from an initial position along said axial direction during said time periods, said moving means including carriage guide means mounted on said base and extending along said record/playback station in said axial direction;

a carriage upon which said transducer means is mounted, said carriage being arranged on said guide means for travel in said axial direction;

carriage drive motor means for moving said carriage from an initial position along said guide means during said time periods, means for returning said carriage to its initial position after said carriage has completed its travel during said time periods, said carriage return means including a spring mounted at one end to said base and coupled at its other end to said carriage whereby said spring produces a torque in a direction so as to cause said carriage to return to said initial position;

means for returning said transducer means to said initial position;

record/playback means coupled to said transducer means and operative during said time periods to record or play back information on or from said tracks; and wherein said carriage further includes;

A. a carriage base mounted to move on said guide means;

B. a slide base mounted to move on said carriage base in a direction orthogonal to the movement of said carriage base;

C. wherein said transducer means for playback and recording is mounted to said slide base such that said transducer means is in proximity with said drum;

D. a second transducer means for erasing information stored in said plurality of information tracks which second transducer means is mounted to said slide base such that it is in proximity with said drum and so that said second transducer means leads said transducer means as said carriage moves away from said initial position;

E. means mounted to said carriage base for moving said slide base toward said drum so that each of said transducer means are in contiguous relationship with said magnetic material as said carriage moves away from said initial position; and F. means for returning said slide base back from said drum after said carriage has completed its movement along said guide means.

12. Information storage apparatus comprising:

a base;

a drum mounted upon said base and having an outer surface of magnetic material on which information is adapted to be stored in a plurality of information tracks which are parallel to the drum axis;

a record/playback transducer means arranged for movement along the periphery of said drum in an axial direction at a record/playback station which extends along the axial length of said tracks, drum drive motor means mounted upon said base for rotating said drum about its axis so as to selectively present said information tracks to said record/-playback station for finite time periods, means for moving said transducer means from an initial position along said axial direction during said time periods, said moving means including carriage guide means mounted on said base and extending along said record/playback station in said axial direction;

a carriage upon which said transducer means is mounted, said carriage being arranged on said guide means for travel in said axial direction;

carriage drive motor means for moving said carriage from an initial position along said guide means during said time periods, means for returning said carriage to its initial position after said carriage has completed its travel during said time periods, said carriage return means including a spring mounted at one end to said base and coupled at its other end to said carriage whereby said spring produces a torque in a direction so as to cause said carriage to return to said initial position;

means for returning said transducer means to said initial position;

record/playback means coupled to said transducer means and operative during said time periods to record or play back information on or from said tracks; and wherein said drum drive motor means includes:

A. a stepping motor coupled to rotate said drum;

B. means adapted to receive a track member indicating a selected one of said plurality of information tracks;

C. means for indicating the present number of said one of said plurality of tracks which is positioned proximate to said transducer means; and D. means responsive to said selected track number for incrementing said stepping motor until said selected track number and said present number are equivalent;

wherein said indicating means includes:

A. a magnet mounted to said carriage; and

B. magnetically actuable switches mounted at selected positions parallel to the movement of said carriage such that the proximity of said magnet to one of said switches causes said one of said switches to be actuated thereby generating a carriage position signal which signal further indicates the position of said transducer means on a selected one of said plurality of information tracks.

13. Apparatus as defined in claim 12 further including:

A. means adapted to receive a track length number indicating the portion along said selected one of said plurality of information tracks which said carriage is to move;

B. means for energizing said carriage drive motor means when said carriage is positioned at said initial position; and C. means for deenergizing said carriage drive motor means when said carriage has moved said portion indicated by said track length number as signaled by the actuation of a corresponding one of said switches.

14. A transducer assembly for playback and recording of information on a magnetic storage medium, said assembly comprising:

A. a first base adapted for movement along a first axis which is substantially parallel to said medium;

B. a second base mounted to move on said first base along an axis orthogonal to said first axis;

C. a magnetic transducer positioned on said second base so that movement of said second base causes said transducer to move in and out of contact with said medium;

D. means mounted to said first base for moving said second base toward said medium so that said transducer is in contiguous relationship with said medium; and E. means for returning said second base back from said medium.

15. A transducer assembly as defined in claim 14 further including a plurality of bearings positioned between said first base and said second base upon which said second base may move.

16. A transducer assembly as defined in claim 15 wherein said means for moving includes a solenoid coupled to move said second base toward said medium when said solenoid is energized.

17. A transducer assembly as defined in claim 16 wherein said means for returning includes a spring coupled between said first base and said second base, said spring being compressed when said solenoid is energized and said spring becoming uncompressed and causing said second base to move back from said drum when said solenoid is deenergized.

18. A transducer assembly as defined in claim 17 wherein said transducer is adjustably mounted to said second base so that said transducer may come in contact with a selected area on said medium when said solenoid is energized.

19. Information storage apparatus comprising:

a drum having an outer surface of magnetic material on which information is adapted to be stored in a plurality of information tracks which are parallel to the drum axis;

a record/playback transducer means arranged for movement along the periphery of said drum in an axial direction at a record/playback station which extends along the axial length of said tracks, drum drive motor means for rotating said drum about its axis so as to selectively present said information tracks to said record/playback station for finite time periods, means for moving said transducer means from an initial position along said axial direction during said time periods, said moving means including carriage guide means extending along said record/playback station in said axial direction;

a carriage upon which said transducer means is mounted, said carriage being arranged on said guide means for travel in said axial direction;

carriage drive motor means for moving said carriage from an initial position along said guide means during said time periods;

means for returning said carriage to its initial position after said carriage has completed its travel during said time periods;

said carriage further including a carriage base mounted to move on said guide means;

a slide base mounted to move on said carriage base in a direction orthogonal to the movement of said carriage base;

wherein said transducer means for playback and recording is mounted to said slide base such that said transducer means is in proximity with said drum;

a second transducer means for erasing information stored in said plurality of information tracks which second transducer means is mounted to said slide base such that it is in proximity with said drum and so that said second transducer means leads said transducer means as said carriage moves away from said initial position;

means mounted to said carriage base for moving said slide base toward said drum so that each of said transducer means are in contiguous relationship with said magnetic material as said carriage moves away from said initial position;

means for returning said slide base back from said drum after said carriage has completed its movement along said guide means; and means for returning said transducer means to said initial position; and record/playback means coupled to said transducer means and operative during said time periods to record or play back information on or from said tracks.

* * * * *